(12) United States Patent
Chang et al.

(10) Patent No.: US 7,196,125 B2
(45) Date of Patent: Mar. 27, 2007

(54) POLY(TRIMETHYLENE TEREPHTHALATE) FIBERS USEFUL IN HIGH-UV EXPOSURE END USES

(75) Inventors: Jing Chung Chang, Boothwyn, PA (US); Donald P. Nolan, Matthews, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 119 days.

(21) Appl. No.: 10/865,112

(22) Filed: Jun. 10, 2004

(65) Prior Publication Data

US 2005/0277714 A1 Dec. 15, 2005

(51) Int. Cl.
*C08K 5/3417* (2006.01)
*C09B 67/00* (2006.01)

(52) U.S. Cl. ............... 524/94; 8/401; 8/566; 8/573; 8/576; 8/606; 8/611; 8/636

(58) Field of Classification Search ............... 524/94; 8/401, 566, 606, 922, 573, 576, 611, 636
See application file for complete search history.

(56) References Cited

U.S. PATENT DOCUMENTS

| 5,575,958 | A | * | 11/1996 | J ollenbeck et al. | ........ | 252/589 |
|---|---|---|---|---|---|---|
| 5,782,935 | A | | 7/1998 | Hirt et al. | | |
| 6,071,835 | A | * | 6/2000 | Tang et al. | ........ | 442/216 |
| 6,187,900 | B1 | | 2/2001 | Tseng et al. | | |

FOREIGN PATENT DOCUMENTS

| DE | 101 29 366 A1 | 1/2003 |
|---|---|---|
| JP | 63-85111 | 4/1988 |
| JP | 1999269779 A | 10/1999 |
| JP | 2000 192375 A | 7/2000 |
| JP | 2002 054047 A | 2/2002 |
| JP | 2002 180384 A | 6/2002 |

OTHER PUBLICATIONS

H.P. Haerri, "Lasting Coloration Of Automotive Textiles" Travel and Transportation Textiles, (Apr. 2000) pp. 2-18, Ciba Specialty Chemicals, Inc.
H.L. Traub, "Synthese und textilchemische Eigenschaften des Poly-Trimethyleneterephthalats", Dissertation Universitat Stuttgart (Feb. 7, 1994).
S. Schauhoff, "New Developments in the Production of Poly(trimethylene terephthalate) (PTT)", Man-Made Fiber Year Book (Sep. 1996).
"Solution-Dyed Polyester Gains in Colorfastness", Fabric Formation, (Mar. 1997), p. 127.
H. Welling, "Fibers Industry Get Ready", Apparel Industry Magazine, (Dec. 1998), pp. 65-66.
International Search Report dated Dec. 28, 2005.

* cited by examiner

*Primary Examiner*—Kriellion Sanders
(74) *Attorney, Agent, or Firm*—Mark D. Kuller; Bart E. Lerman

(57) ABSTRACT

Dyed poly(trimethylene terephthalate) fibers having a lightfastness of 4 or higher after approximately 480 kJ incident UV radiation, and processes for preparing the fibers, are provided. The fibers are useful in automotive applications and other uses wherein UV absorption is likely.

18 Claims, No Drawings

POLY(TRIMETHYLENE TEREPHTHALATE) FIBERS USEFUL IN HIGH-UV EXPOSURE END USES

FIELD OF THE INVENTION

This invention relates to dyed poly(trimethylene terephthalate) fibers and processes for making the poly(trimethylene terephthalate) fibers. The fibers are suitable for use in applications wherein the fibers are subjected to significant UV exposure, such as automotive uses.

BACKGROUND

Poly(trimethylene terephthalate) (also referred to as "3GT" or "PTT") has recently received much attention as a polymer for use in textiles, flooring, packaging and other end uses.

Certain end uses place rigorous demands on fibers. For example, in automotive interiors, fabrics are expected to maintain desirable physical properties over extended periods of use and, potentially, extreme environmental conditions. Even with the advent of sun-shielding tinted windows, UV exposure can be very high. Compounding this are extremes in temperature ranges spanning from sub-freezing, wherein softness is generally preferred to brittleness, to super heated greenhouse-like conditions, especially in more southern areas of the North American continent. Transportation end uses, from aircraft to pleasure boats, have some of the same rigorous conditions of more widespread automotive end uses.

In the area of automotive interiors, different end uses include seat covering material, door panel decorative panels and headliners. Colorfastness is desired in all of these applications. Maintenance of physical characteristics other than color is also desirable. In some of these applications, perhaps more important than absolute value for any given physical parameter, e.g. elongation, (some of which can be compensated for by design considerations), is the stability of physical performance over extended periods of testing/time.

In addition to transportation linked end uses, outdoor end uses including housing (awnings), garden and patio furniture, and certain items of apparel and personnel (sun) protective equipment can place extreme UV and heat stability requirements on fabric materials employed.

A fabric material possessing highly desirable aesthetic qualities is fabric made with fibers comprising poly(trimethylene terephthalate), also referred to as "PTT" or "3GT". Such fabrics exhibit softness (hand), resiliency, and stretch recovery, among other desirable properties. Physical properties of testing interest include tenacity and elongation.

Travel and Transportation Textiles (Ciba Specialty Chemicals, Inc., April 2000) presents an overview of automotive fabric dyeing technology. The potential utility of poly(trimethylene terephthalate) fiber in automotive fabrics is discussed in view of its attractive physical properties, but results of high temperature light fastness tests indicate "difficulties in reaching the level of performance of regular polyester" (i.e. polyethylene terephthalate). The publication states that "regular polyester has become and will remain the dominant fiber for upholstery for at least the near future". The use of UV absorbers is discussed as a method of improving lightfastness, but only in connection with regular polyester (Tersuisse® brand of polyester from Rhodia was used in testing.) JP 2000 192375A discloses a method for dyeing poly(trimethylene terephthalate) fabric to yield sublimation color fastness. The publication discloses that after dyeing the poly(trimethylene terephthalate) fabric at 90–140° C., for 15 to 90 minutes, the dyed fabric is removed from the dyebath at a temperature between 55° C. and the boiling point of the dyebath, which provides the desired colorfastness. The only tests carried out on the resulting dyed poly(trimethylene terephthalate) fabrics are tests for sublimation fastness and sublimation fastness during storage.

JP 2002 180384A discloses a dyed article composed of poly(trimethylene terephthalate) fiber having color fastness to light of grade 3 or higher, and a production method thereof, a triazine and/or benzotriazine derivative as a light resistance improving agent. The publication discloses that dyeing can be carried out at 90–130° C. for 15 to 120 minutes, and exemplifies dyeing at 120° C. for 45 minutes. Conditions of UV exposure and lightfastness testing are not disclosed.

It is known that poly(trimethylene terephthalate) can be dyed at atmospheric pressure, at temperatures of 100° C. or less, in aqueous media. For example, U.S. Pat. No. 5,782,935 discloses a process for the dyeing of poly(trimethylene terephthalate) fibers by treating the fibers in an aqueous liquor in the absence of a carrier and without the application of pressure, at or below the boiling point of the aqueous liquor. U.S. Pat. No. 6,187,900 B1 discloses a dyeable fiber of poly(trimethylene terephthalate) and poly(ethylene terephthalate); dyeing is carried out at or below 100° C. in the absence of a carrier. JP 2002 054047A discloses that the dyeing of sewing thread comprising poly(trimethylene terephthalate) is advantageously carried out at atmospheric pressure at 98° C. rather than under pressure at 120° C.

The ability to dye poly(trimethylene terephthalate) fibers at higher temperatures and pressures than those at which such dyeing is conventionally carried out, and to provide poly(trimethylene terephthalate) having improved colorfastness, are desired. The present invention is directed to these and other important ends.

SUMMARY OF THE INVENTION

The present invention provides colored poly(trimethylene terephthalate) fibers, and processes for producing the fibers. The fibers are suitable for use in transportation end uses, in which fibers can be subjected to high UV exposures, often also in the presence of stringent heat conditions. The processes include the use of a benzotriazine derivative UV absorber.

One aspect of the present invention is a composition, i.e., a fiber-dye combination, comprising poly(trimethylene terephthalate), a disperse dye, and a benzotriazine derivative UV absorber, and having a light fastness of 4 or higher after at least 488 kJ incident UV radiation under standard testing conditions. In some embodiments, the fiber has a light fastness of 3 or higher, more particularly 3 to 5, and in preferred embodiments even 4 or higher, more particularly 4 to 5, after at least 779 kJ incident UV radiation under standard testing conditions, depending on the composition of the disperse dye. In preferred embodiments, the fiber-dye combination exhibits a loss of tenacity less than about 10% following exposure to at least 481 kJ of UV radiation.

Another aspect of the invention is a colored fiber comprising poly(trimethylene terephthalate), a disperse dye, and a benzotriazine derivative UV absorber, and having a light fastness of 4 or higher after at least 488 kJ incident UV radiation under standard testing conditions. In some embodiments, the fiber has a light fastness of 4 or higher after at least 779 kJ incident UV radiation under standard testing conditions, depending on the composition of the disperse dye. In preferred embodiments, the fiber-dye combination exhibits a loss of tenacity less than about 10% following exposure to at least 481 kJ of UV radiation.

Another aspect of the invention is a process for making dyed poly(trimethylene tereptthalate)s comprising:

a. providing a poly(trimethylene terephthalate) fiber;
b. combining at room temperature in an aqueous medium about 0.50 weight percent of an alcohol ethoxylate surfactant, about 0.25 weight percent of a sequestering agent, 3.00 weight percent of a benzotriazine derivative UV absorber, 0.5 weight percent of a disperse dye, and sufficient water to provide a water:fiber ratio from about 2:1 to about 40:1, all weight percents on weight of fiber, to form a dyebath;
c. adjusting the pH of the dyebath to about 4.0 to about 5.0;
d. heating the dyebath at a rate of at least about 1° C. per minute to a temperature of 132–145° C.;
e. immersing the poly(trimethylene terephthalate) fiber in the dyebath;
f. maintaining the dyebath temperature for at least about 30 minutes to produce a dyed poly(trimethylene terephthalate) fiber;
g. allowing the dye bath to cool; and
h. rinsing the dyed poly(trimethylene terephthalate) fiber.

In some embodiments, the fiber has a light fastness of 4 or higher after exposure to 488 kJ incident UV radiation when tested using test method AATCC Method 16-1998.

In some embodiments, the fiber has a light fastness of 4 or higher after exposure to 779 kJ incident UV radiation when tested using test method AATCC Method 16-1998, when the disperse dye is selected from: Chemical Index (CI) Disperse Red 86, CI Disperse Red 161, CI Disperse Yellow 42, CI Disperse Yellow 96, CI Disperse Yellow 160, CI Disperse Blue 200, CI Disperse Blue 60 and CI Disperse Blue 77.

DETAILED DESCRIPTION OF THE INVENTION

The present invention provides fibers comprising poly(trimethylene terephthalate), and processes for making dyed poly(trimethylene terephthalate). Fibers made according to the processes disclosed herein can have lightfastness ratings of at least 4 after exposure to 488 kJ of UV radiation under standardized testing conditions, and even after exposure 779 kJ of UV radiation when certain disperse dyes are used. It has been surprisingly found that with the use of the processes disclosed herein, poly(trimethylene terephthalate) fibers dyed at temperatures and pressures higher than even the highest temperatures disclosed in some prior publications, such as JP 2000 192375A and JP 2002 180384A, have improved colorfastness in comparison with poly(trimethylene terephthalate) fibers dyed using conventional processes. While it is not intended that the invention be bound by any particular theory, it is believed that the processes disclosed herein allow relatively deeper penetration of the fibers by dye molecules, which improves colorfastness.

Fibers made according to the processes disclosed herein can also be referred to as "fiber-dye combinations", indicating the presence of dye molecules with the fibers.

A process for making dyed poly(trimethylene tereptthalate)s according to the present invention comprises:

a. providing a poly(trimethylene terephthalate) fiber;
b. combining at room temperature in an aqueous medium about 0.50 weight percent of an alcohol ethoxylate surfactant, about 0.25 weight percent of a sequestering agent, 3.00 weight percent of a benzotriazine derivative UV absorber, 0.5 weight percent of a disperse dye, and sufficient water to provide a water:fiber ratio from about 2:1 to about 40:1, all weight percents on weight of fiber, to form a dyebath;
c. adjusting the pH of the dyebath to about 4.0 to about 5.0;
d. heating the dyebath at a rate of at least about 1° C. per minute to a temperature of 132–145° C.;
e. immersing the poly(trimethylene terephthalate) fiber in the dyebath;
f. maintaining the dyebath temperature for at least about 30 minutes to produce a dyed poly(trimethylene terephthalate) fiber;
g. allowing the dye bath to cool; and
h. rinsing the dyed poly(trimethylene terephthalate) fiber.

All percentages in the foregoing process are weight percents "on the weight of fiber" (OWF).

The processes disclosed herein provide poly(trimethylene terephthalate) fibers having desirable lightfastness with a rating of 4 or higher, more particularly from 4 to 5, under 488 kJ UV exposure by AATCC Method Number 16-1998 with certain disperse dyes, especially such dyes suitable for dyeing automotive fabrics, particularly Color Index ("CI") Disperse Red 86, CI Disperse Red 91, CI Disperse Red 161, CI Disperse Red 279, CI Disperse Yellow 42, CI Disperse Yellow 96, CI Disperse Yellow 160, CI Disperse Blue 27, CI Disperse Blue 60, and CI Disperse Blue 77, at 0.5% on weight of fibers (OWF) dyeing depths. According to AATCC Method Number 16-1998, ratings of lightfastness range from 1 to 5, 5 being the highest rating. Thus, a lightfastness of 4 to 5 is highly desirable.

In some preferred embodiments, the processes disclosed herein provide poly(trimethylene terephthalate) fibers having desirable lightfastness with a rating of 4 or higher at 779 kJ UV exposure with certain disperse dyes, particularly CI Disperse Red 86, CI Disperse Red 161, CI Disperse Yellow 42, CI Disperse Yellow 96, CI Disperse Yellow 160, CI Disperse Blue 60 and CI Disperse Blue 77 at 0.5% OWF dyeing depths.

Percentage quantities of dyes are disclosed herein as "% OWF", which means weight percent dye based on the weight of fiber.

CI Disperse dyes are known to those skilled in the art, and appropriate disperse dyes for use in dyeing polyester fibers, particularly poly(trimethylene terephthalate) fibers, can be selected by the skilled person. Examples of commercially available disperse dyes suitable for use in dyeing fibers, particularly fibers suitable for automotive uses, produced according to the processes disclosed herein include: Terasil® Pink 2GLA-01 (CI Disperse Red 86), Disperserite® Pink REL (CI Disperse Red 91), Dorospers® Red KFFB (CI Disperse Red 161), Dorospers® Red KFFN (CI Disperse Red 279), Terasil® Yellow GWL (CI Disperse Yellow 42), Dorospers® Golden Yellow R. Conc (CI Disperse Yellow 96), Dianix® Yellow SG (CI Disperse Yellow 160), Terasil® Blue GLF (CI Disperse Blue 27), Terasil® Blue BGE-01 (200) (CI Disperse Blue 60) and Dorospers Blue BLFR (CI Disperse Blue 77). Newly developed disperse dyes having the colorfastness characteristics and suitable for use under the conditions disclosed herein for dyeing poly(trimethylene terephthalate) fibers are intended to be within the scope of the present invention. One skilled in the art will recognize that such dyes can be tested using the standard conditions disclosed herein, on commercially available poly(trimethylene terephthalate)s such as, for example, Sorona® 3GT polymer.

Unless otherwise stated, the terms "poly(trimethylene terephthalate)", "3GT" and "PTT", as used herein, include homopolymers and copolymers containing at least 70 mole % trimethylene terephthalate repeat units, and polymer blends containing at least 70 mole % of trimethylene terephthalte homopolymers or copolyesters. Preferred poly(trimethylene terephthalate)s, including copolymers and blends, contain at least 85 mole %, more preferably at least 90 mole %, even more preferably at least 95 mole %, still more preferably at least 98 mole %, and most preferably about 100 mole %, trimethylene terephthalate repeat units. For convenience, poly(trimethylene terephthalate)s are also referred to herein as "3GTs".

The term "mole percent", as used herein, means the percent of a particular component, in moles, based on the total number of moles of, for example, monomer units in a polymer.

Examples of poly(trimethylene terephthalate) copolymers include copolyesters made using 3 or more reactants, each having two ester forming groups. For example, a copoly (trimethylene terephthalate) can be made using a comonomer selected from linear, cyclic, and branched aliphatic dicarboxylic acids having 4–12 carbon atoms, such as butanedioic acid, pentanedioic acid, hexanedioic acid, dodecanedioic acid, and 1,4-cyclo-hexanedicarboxylic acid); aromatic dicarboxylic acids other than terephthalic acid and having 8–12 carbon atoms, such as isophthalic acid and 2,6-naphthalenedicarboxylic acid; linear, cyclic, and branched aliphatic diols having 2–8 carbon atoms, other than 1,3-propanediol, such as ethanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms, such as hydroquinone bis(2-hydroxyethyl) ether. Alternatively, a copoly(trimethylene terephthalate) can be made using a poly(ethylene ether) glycol having a molecular weight below about 460, such as diethyleneether glycol. The comonomer typically is present in the copolyester at from about 0.5 mole % to about 15 mole %, and can be present in amounts up to 30 mole %.

The poly(trimethylene terephthalate) can contain minor amounts, e.g., about 10 mole % or less, in some embodiments about 5 mole % or less, of one or more comonomers other than trimethylene terephthalate, and such comonomers are usually selected so that they do not have a significant adverse affect on properties. Exemplary comonomers that can be used include functional comonomers such as 5-sodium-sulfoisophthalate, which is preferably used at an amount within the range of about 0.2 to 5 mole %. Very small amounts, about 5 mole % or less, even 2 mole % or less, of trifunctional comonomers, such as, for example trimellitic acid, can be incorporated for viscosity control.

A poly(trimethylene terephthalate) homopolymer or copolymer can be blended with one or more other polymers. Preferably, if blended, the poly(trimethylene terephthalate) is blended with about 30 mole percent or less of one or more other polymers. Examples of polymers suitable for blending with a poly(trimethylene terephthalate) homopolymer or copolymer are polyesters prepared from other diols, such as those described above. Preferred poly(trimethylene terephthalate) blends contain at least 85 mole %, more preferably at least 90 mole %, even more preferably at least 95 mole %, still more preferably at least 98 mole %, poly(trimethylene terephthalate) polymer. In certain highly preferred embodiments, blends contain substantially about 100 mole % poly (trimethylene terephthalate) homopolymer or copolymer. For some applications, blends are not preferred.

The intrinsic viscosity of the poly(trimethylene terephthalate) is at least about 0.70 dl/g, preferably at least about 0.80 dl/g, more preferably at least about 0.90 dl/g and most preferably at least about 1.0 dl/g. Also, the intrinsic viscosity is preferably not greater than about 2.0 dl/g, more preferably not greater than about 1.5 dl/g, and most preferably not greater than about 1.2 dl/g.

The number average molecular weight ($M_n$) of the poly (trimethylene terephthalate) is preferably at least about 10,000, more preferably at least about 20,000, and is also preferably about 40,000 or less, more preferably about 25,000 or less. The preferred $M_n$ depends on the components of the poly(trimethylene terephthalate), and also can be affected by the nature and amount of any additives or modifiers used that affect the physical properties of the poly(trimethylene terephthalate).

Poly(trimethylene terephthalate) and methods for making poly(trimethylene terephthalate) are known and are described, for example, in U.S. Pat. Nos. 5,015,789, 5,276, 201, 5,284,979, 5,334,778, 5,364,984, 5,364,987, 5,391,263, 5,434,239, 5,510,454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745, 5,990,265, 6,235,948, 6,245,844, 6,255,442, 6,277,289, 6,281,325, 6,312,805, 6,325,945, 6,331,264, 6,335,421, 6,350,895, and 6,353,062, EP 998 440, WO 00/14041 and 98/57913, H. L. Traub, "Synthese und textilchemische Eigenschaften des Poly-Trimethylene-terephthalats", Dissertation Universitat Stuttgart (1994), S. Schauhoff, "New Developments in the Production of Poly (trimethylene terephthalate) (PTT)", Man-Made Fiber Year Book (September 1996), and U.S. patent application Ser. No. 10/057,497, all of which are incorporated herein by reference. Poly(trimethylene terephthalate)s are commercially available from E. I. du Pont de Nemours and Company, Wilmington, Del., as Sorona® 3GT polymer.

Other polymeric additives can be added to the poly (trimethylene terephthalate) polymers, copolymers or blends to improve strength, to facilitate post extrusion processing or provide other benefits. For example, hexamethylene diamine can be added in minor amounts of about 0.5 to about 5 mole % to add strength and processability to the polymers. Polyamides such as Nylon 6 or Nylon 6—6 can be added in minor amounts of about 0.5 to about 5 mole % to add strength and processability to the polymers. A nucleating agent, preferably 0.005 to 2 weight % of a mono-sodium salt of a dicarboxylic acid selected from the group consisting of monosodium terephthalate, mono sodium naphthalene dicarboxylate and mono sodium isophthalate, as a nucleating agent, can be added as disclosed in U.S. Pat. No. 6,245,844, which is incorporated herein by reference.

The poly(trimethylene terephthalate) polymers and blends can, if desired, contain additives, e.g., delusterants, nucleating agents, heat stabilizers, viscosity boosters, optical brighteners, pigments, and antioxidants. $TiO_2$ or other pigments can be added to the poly(trimethylene terephthalate)s and blends, or in fiber manufacture. Additives suitable for use with the poly(trimethyene terephthalate)s are disclosed, for example, in U.S. Pat. Nos. 3,671,379, 5,798,433 and 5,340,909, EP 699 700 and 847 960, and WO 00/26301, which are incorporated herein by reference.

In some embodiments, the poly(trimethylene terephthalate) fiber is provided in the form of a fabric, e.g., a woven fabric or a nonwoven fabric. Also, in some embodiments, the fiber, optionally as a fabric, is immersed in water prior to the addition thereto of the surfactant, the sequestering agent, the UV absorber, and/or the dye.

Preferably, the process is initiated, i.e., the fiber and dyebath components are combined, at room temperature, which can be, for example, about 22 to 28° C. Also preferably, the process is carried out at autogenous pressure in a sealed vessel. Because the vessel is sealed, during the process, the pressure within the vessel rises. About 0.50 weight percent of an alcohol ethoxylate surfactant, about 0.25 weight percent of a sequestering agent, 3.00 weight percent of a benzotriazine derivative UV absorber, and 0.5 weight percent of a disperse dye, are combined in an aqueous medium to provide a water:fiber ratio from about 2:1 to about 40:1. Preferably, the water:fiber ratio is at least about 6:1. The water:fiber ratio can vary depending upon the equipment being used in the process, which depends in part upon the volume of materials being used in the process. In some applications of the process, particularly larger scale production, a water:fiber ratio of about 8:1 to about 12:0 may be preferred, even more preferably about 10:1. When the fiber is used in the form of a fabric, the same ratios apply, i.e. based on weight, the ratio is a water:fabric ratio. However a range of such ratios can be used. The appropriate ratio for a particular application can be selected by one skilled in the art.

In the process, the dyebath and components thereof and the fiber are heated at a rate of at least about 1° C. per minute, and slower than 8° C. per minute. Preferably, the heating rate is about 5° C. per minute or slower, more preferably about 4° C. per minute or slower, most preferably about 3° C. or slower. In highly preferred embodiments, the heating rate is about 2° C. per minute.

The dyebath and components are heated to a temperature of 132–145° C., preferably 132–140° C., more preferably 132–135° C., and in highly preferred embodiments, to about 132° C. Once the dyebath has reached the desired temperature, it is maintained at that temperature for at least about 30 minutes, preferably at least about 45 minutes. Typically, maintaining the dyebath at the desired temperature for about 60 minutes will ensure adequate dyeing; however, shorter or longer periods of time may be desirable for certain dye formulations and depending upon the shade and intensity of color desired in the dyed fiber.

The process uses a benzotriazine derivative UV absorber. Such absorbers are commercially available from, for Example, Ciba Geigy, Inc. A preferred benzotriazine derivative UV absorber is Cibafast USM® UV absorber.

The amount of UV absorber is preferably at least about 2 weight percent, and more preferably at least about 3 weight percent. Although higher UV absorber amounts than, for example, about 4 weight percent, can be used, the use of such higher levels is not required and may not be cost effective for some applications.

The pH of the dyebath can be adjusted by adding a suitable acid. Acetic acid is preferred, although other organic or inorganic acids, including propionic acid and formic acid, can be used. Preferably, the pH of the dyebath is adjusted to within the range of 4.2 to about 4.85, preferably from about 4.25 to 4.7, more preferably 4.50 to 4.75.

Alcohol ethoxylate surfactants are known and are commercially available. An exemplary alcohol ethoxylate surfactant is Surfactant LF-H, available from DuPont Specialty Chemicals, Wilmington, Del.

The processes disclosed herein use a sequestering agent. Sequestering agents, also known as chelating agents, remove undesired or excess ions from solutions. Examples of sequestering agents are ethylene diamine tetraacetic acid (EDTA) and derivatives thereof, including nitrilo triacetic acid (NTA), diethylene triamine pentaacetic acid ((DTPA) and salts thereof. EDTA is a preferred sequestering agent. Sequestering agents are well known and commercially available. EDTA is commercially available, for example, as Versene® 100 EDTA from Dow Chemical Co., Midland, Mich.

After the fiber has been immersed in the dyebath and the dyebath maintained at the desired temperature for the desired period of time, the dyebath is allowed to cool before the fiber is rinsed. The dyebath can be allowed to return to room temperature without the use of any external cooling methods or devices, or, if desired, cooling can be facilitated by, for example, the application of cooling water. Also, upon cooling, the dyebath depressurizes, preferably to atmospheric pressure.

It is advantageous to precede the foregoing process with a prescour to remove dirt, particles, and other impurities that could impede dyeing. A prescour can be carried out, for example, by maintaining the poly(trimethylene terephthalate) fiber at about 60° C. for about 20 minutes in a bath containing: 0.50% surfactant, 0.25% sequestering agent, and 0.50% TSPP (tetrasodium pyrophosphate).

It is also advantageous to follow the dyeing process with a reductive after-scour, to remove loose dye molecules and residual chemicals, which aids in maximizing lightfastness. The after-scour preferably includes: providing a scour bath by adding, at room temperature, 2.0 g/l sodium hydrosulfite and 2.0 g/l soda ash; raising the temperature, e.g., at a rate of about 1–22° C. per minute to about 60° C. or higher, but less than 180° C.; holding at temperature 60° C. for 20 minutes; and rinsing and neutralizing the fiber. Neutralization can be accomplished, for example, with a final rinse in a bath having a pH adjusted to 6.0–7.0 by addition of a suitable organic acid such as acetic acid.

The present processes provide dyed fibers, e.g., colored fibers that perform desirably using standard lightfastness testing. Lightfastness testing procedures are known to those skilled in the art, and are described in publications of the American Association of Textile Chemists and Colorists (AATCC). Poly(trimethylene terephthalate) fibers, including fibers made from blends and compolymers, made according to the processes disclosed herein have been found to show no color break worse than a 4 break, i.e., no lower than a 4 on the AATCC greige scale, after exposure to 488 kJ of UV light according to standard test method AATCC 16-1998. In some embodiments, a color break no worse than 4 has been observed following 779 kJ UV light exposure (using the same testing procedure but effectively using a more stringent testing than a test using 488 kJ of UV light) when certain disperse dyes are employed in the dyeing process.

Further, fibers are obtained that demonstrate desirable retention of physical properties besides color. Tests of tenacity before and after extensive UV exposure indicate little loss in tenacity. Preferably, the tenacity of dyed poly(trimethylene terephthalate) fibers prepared according to the processes disclosed herein exhibit a loss of tenacity of about 10% or less, following exposure to at least 481 kJ of UV radiation. More preferably, the tenacity of dyed poly(trimethylene terephthalate) fibers prepared according to the processes disclosed herein exhibit a loss of tenacity of about 10% or less, following exposure to at least 779 kJ of UV radiation.

For testing color fastness and strength under UV exposure, candidate fibers are typically knitted to test forms in the shape of tubing, or wrapped on cards. Testing can be carried out, for example, in a Weather-O-Meter® UV exposure device. Physical properties that can be tested include tenacity and elongation, and color fastness under rigorous UV light exposure/high temperature conditions.

EXAMPLES

The following examples are presented for the purpose of illustrating the invention, and are not intended to be limiting. All parts, percentages, etc., are by weight unless otherwise indicated.

Tenacity

The tenacity of the poly(trimethylene terephthalate) yarns reported in the following examples was measured using an Instron Corp. tensile tester, model no. 1122. Tenacity was measured according to ASTM D-2256.

Xenon Light Fastness

The Xenon light fastness testing was done using an "Atlas" Weatherometer (Atlas Material Testing Technology LLC, 4114 N. Ravenswood Ave., Chicago, Ill. 60613) following the established testing procedures of AATCC Method 16-1998 and blue wool light fastness standard L-4 (lot 5).

Visual ratings were made on all samples after exposure to UV light utilizing the AATCC greige scale rating system of 1 through 5, wherein 5 indicates "no visible change" and 1 indicates "severe color change". The rating of one half unit was considered not to be a significant variation between polymer substrates, and a 4 rating or greater was judged to be excellent fading performance after extended exposure to ultraviolet light.

Degradation of Tenacity by Exposure to UV Radiation

The impact of extended exposure to ultraviolet light on the tensile properties of yarns of Sorona® PTT was tested. The baseline tenacity was obtained from measurements on "mock dyed" knit tubing of the textured yarns of Soma® PTT. "Mock dyeing" means that all components of a dyebath other than a colored dye are used, and all of the steps in the dyeing process, including temperature, pressure etc. are included. Mock dyeing is used to provide a baseline for strength retention testing of the polymer. The reported data is an average of 10 individual Instron measurements.

The dyed knit tubing, prepared with Cibafast® USM ultraviolet absorber in the dyebath, was tested after exposure in the Atlas Weather-O-Meter® device at 481, 486.5, and 496 kJ. The tenacity of the yarns from the dyed knit tubing from the PTT after extended UV exposure was compared to the initial mock dyed (before exposure) baseline data, and the loss in tenacity due to UV exposure was determined.

Source of Materials

All materials used herein are available commercially. Sorona® poly(trimethylene terephthalate) fiber was obtained from DuPont (Wilmington, Del.). Dacron® poly (ethylene terephthalate) fiber (PET) was obtained from Invista, Inc. Chemical reagents used were as follows:

Dianix® dyes (DyStar L. P., 9844-A Southern Pine Blvd., Charlotte, N.C. 28274); Dispersrite® dyes (Rite Industries, Inc., Highpoint, N.C.); Dorospers® dyes (M. Dohmen USA Inc., 25 Ellwood Conn., Greenville, S.C. 29607); Terasil® dyes and Cibafast® USM (Ciba Specialty Chemicals, Colors Div., 4050 Premier Dr., High Point, N.C. 27265); Versene® 100 (Dow Chemical Co., PO Box 1206, Midland, Mich. 48642); Surfactant LF-H (DuPont Specialty Chemicals, Wilmington, Del. 19898); Burco Reduct T® (Burlington Chemical Co., PO Box 111, Burlington, N.C. 27216).

Testing was conducted on false twist yarns of textured Dacron® poly(ethylene terephthalate) homopolymer (control) and yarns of Sorona® poly(trimethylene terephthalate) homopolymer (test) that were knit into tubing on a Lawson-Hempill FAK circular knit machine (Lawson Hempill Sales Inc., P. O. Drawer 6388, Spartanburg, S.C. 29304).

Test yarns of textured Sorona® poly(trimethylene terephthalate) fiber were tested along with a control yarn of textured Dacron® poly(ethylene terephthalate) utilizing the same dyeing auxiliaries and conditions. In addition to the evaluation of a variety of disperse dyes that were found to exhibit good fastness to light after extended exposure to UV light, the resistance of textured test yarns of Sorona® PTT vs. Dacron® PET control yarns to degradation of tensile properties due to the exposure to UV light was examined. All percentages of dyes and chemicals are weight percents based on the weight of the fabric (OWF). Pre-scour, dyeing, and after-scour were conducted in a Mathis Labomat® BFA 16 test unit (Werner Mathis U.S.A. Inc., 2260 HWY 49 NE/P.O. Box 1626, Concord, N.C. 28206).

Pre-Scour Procedure

Knit tubing of test and control samples was pre-scoured at 60° C. for 20 minutes in a bath containing:
 0.50% Surfactant LF-H® surface active agent
 0.25% Versene® 100 (sequestering agent)
 0.50% tetrasodium pyrophosphate Dyeing Procedure A dye bath was prepared in a vessel at room temperature, containing:
 0.50% "Surfactant" LF-H
 0.25% "Versene" 100 (Sequestering agent)
 3.00% "Cibafast" USM (UV absorber)
 disperse dye (quantities and dyes are shown in Table 1)
 acetic acid as needed to adjust pH to 4.50–4.75

The fabric for testing was immersed in the dyebath, and the vessel was sealed. The temperature was raised at a rate of 2° C. per minute, to 132° C. (270° F.), then held at 132° C. for 45 minutes. The dyebath was cooled and depressurized, and the fabric sample was removed and well rinsed.

Reductive Afterscour Procedure

An afterscour bath was prepared, at room temperature, containing: 2.0 g/l Burco Reduct T® sodium hydrosulfite and 2.0 g/l soda ash. The temperature was raised at 2° C. per minute to 60° C. (140° F.). The fabric was immersed in the afterscour bath, held at 60° C. for 20 minutes, rinsed well, and neutralized with a final rinse in a bath with pH adjusted to 6–7 with acetic acid.

Lightfastness results for fabrics dyed using various dyes and tested at different times of UV exposure are presented in Table 1.

Xenon Arc Lightfastness Test

TABLE 1

| XENON ARC LIGHTFASTNESS AS FUNCTION OF DISPERSE | EXPOSURE | | |
|---|---|---|---|
| DYE COMPOSITION | 488 kJ | 779 kJ | 789 kJ |
| "TERASIL" PINK 2GLA-01 (RED 86) 0.5% OWF | 4–5 | 4–5 | |
| "DISPERITE" PINK REL (RED 91) 0.5% OWF | 4 | 3–4 | |
| "DOROSPERS" RED KFFB (RED 161) 0.5% OWF | 5 | | 4–5 |
| "DOROSPERS" RED KFFN | 5 | | |

TABLE 1-continued

| XENON ARC LIGHTFASTNESS AS FUNCTION OF DISPERSE | EXPOSURE | | |
|---|---|---|---|
| DYE COMPOSITION | 488 kJ | 779 kJ | 789 kJ |
| (RED 279) 0.5% OWF "DOROSPERS" RED KFFN (RED 279) 0.25% OWF | 5 | | |
| "TERASIL" YELLOW GWL (YELLOW 42) 0.5% OWF | 4–5 | 4 | |
| "DOROSPERS" GOLDEN YELLOW R conc. (YELLOW 86) 0.5% OWF | 5 | 5 | |
| "DIANIX" YELLOW S-G (YELLOW 160) 0.5% OWF | 5 | 5 | |
| "TERASIL" BLUE GLF (BLUE 27) 0.5% OWF | 5 | | |
| "TERASIL" BLUE GLF (BLUE 27) 0.25% OWF | 5 | | |
| "TERASIL" BLUE BGE-01 200 (BLUE 60) 0.5% OWF | 5 | 5 | |
| "DOROSPERS" BLUE BLFR (BLUE 77) 0.5% OWF | 5 | | 5 |

Table 2 shows the effect of extended exposure to UV light on the tenacity of textured yarns of Sorona® PTT. The loss of tenacity of the exposed yarns was calculated by comparing the tenacity of the exposed dyed knit tubing to that of the "mock dyed" knit tubing that provided the baseline for the calculations. The high resistance of yarns of Sorona® PTT to the degradation caused by extended exposure to UV light is apparent.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

TABLE 2

Tenacity of Dyed Textured Yarns of Sorona ® PTT after Extended Exposure to UV Radiation

| Sorona ® PTT Test Sample: | Tenacity |
|---|---|
| "Mock Dyed" Control with No UV Exposure | 2.43 g/d |
| Disperse Dyes Evaluated | |
| 0.50% Disperse Red 86 after 486.5 kJ UV exposure | 2.22 g/d |
| 0.50% Disperse Red 91 after 486.5 kJ UV exposure | 2.35 g/d |
| 0.50% Disperse Red 279 after 486.5 kJ UV exposure | 2.10 g/d |
| 0.50% Disperse Blue 27 after 496 kJ UV exposure | 2.19 g/d |
| 0.50% Disperse Blue 60 after 496 kJ UV exposure | 2.24 g/d |
| 0.50% Disperse Blue 77 after 496 kJ UV exposure | 2.29 g/d |
| 0.50% Disperse Yellow 42 after 496 kJ UV exposure | 2.23 g/d |
| 0.50% Disperse Yellow 86 after 481 kJ UV exposure | 2.22 g/d |
| 0.50% Disperse Yellow 160 after 481 kJ UV exposure | 2.27 g/d |
| Average Tenacity of 9 Disperse Dyes Tested | 2.23 g/d |
| Pre-exposure Tenacity of "Mock Dyed" Control | 2.43 g/d |
| Tenacity Loss due to UV Degradation | 0.20 g/d |

The tenacity loss was 8.23%, reflecting retention of >90% of the initial tenacity of disperse dyed samples of textured yarns of Sorona ® PTT after extended UV exposure.

What is claimed is:

1. A process for making a dyed poly (trimethylene terepthalate) comprising:
  a. providing a poly(trimethylene terephthalate) fiber,
  b. combining at room temperature in an aqueous medium about 0.50 weight percent of an alcohol ethoxylate surfactant, about 0.25 weight percent of a sequestering agent, about 3.00 weight percent of a benzotriazine derivative UV absorber, 0.5 weight percent of a disperse dye, and sufficient water to provide a water:fiber ratio from about 2:1 to about 40:1, all weight percents on weight of fiber, to form a dyebath;
  c. adjusting the pH of the dyebath to about 4.0 to about 5.0;
  d. combining the fiber and dyebath at room temperature;
  e. heating the dyebath at a rate of at least about 1° C. per minute to a temperature of 132–145° C.;
  f. maintaining the dyebath temperature for at least about 30 minutes to produce a dyed poly(trimethylene terephthalate) fiber;
  g. allowing the dye bath to cool; and
  h. rinsing the dyed poly(trimethylene terephthalate) fiber.

2. The process of claim 1 wherein the disperse dye is selected from CI Disperse Red 86, CI Disperse Red 91, CI Disperse Red 161, CI Disperse Red 279, CI Disperse Yellow 42, CI Disperse Yellow 96, CI Disperse Yellow 160, CI Disperse Blue 27, CI Disperse Blue 60, and CI Disperse Blue 77.

3. The process of claim 1 wherein the dyed fiber has a lightfastness of 4 or higher after exposure to at least 448 kJ incident UV radiation.

4. The process of claim 1 wherein the disperse dye is selected from CI Disperse Red 86, CI Disperse Red 161, CI Disperse Yellow 42, CI Disperse Yellow 96, CI Disperse Yellow 160, CI Disperse Blue 200, CI Disperse Blue 60 and CI Disperse Blue 77.

5. The process of claim 4 wherein the dyed fiber has a lightfastness of 4 or higher after exposure to at least 779 IC incident UV radiation.

6. The process of claim 1 wherein the dyebath is heated to a temperature of about 132° C.

7. The process of claim 1 wherein the pH is from about 4.25 to about 4.7.

8. The process of claim 1 wherein the pH is about 4.5.

9. The process of claim 1 wherein the dyebath is heated at a rate of about 2° C. per minute.

10. The process of claim 1 wherein the fiber has an intrinsic viscosity of at least about 0.70 dl/g.

11. The process of claim 1 wherein the fiber has an intrinsic viscosity of at least about 0.80 dl/g.

12. The process of claim 1 wherein the fiber has an intrinsic viscosity of at least about 0.90 dl/g.

13. The process of claim 1 wherein the fiber has an intrinsic viscosity of at least about 1.0 dl/g.

14. The process of claim 1 wherein the fiber has an intrinsic viscosity of about 2.0 dl/g or less.

15. The process of claim 1 wherein the fiber has an intrinsic viscosity of about 1.5 dl/g or less.

16. The process of claim 1 wherein the fiber has an intrinsic viscosity of about 1.2 dl/g or less.

17. The process of claim 1 wherein the fiber has a lightfastness of 4 to 5 after exposure to at least 488 kJ incident UV radiation.

18. The process of claim 1 wherein the fiber has an initial tenacity, and wherein said initial tenacity declines by about 10% or less after exposure to at least 481 kJ incident UV radiation.

* * * * *